US011022836B2

(12) United States Patent
Xie et al.

(10) Patent No.: US 11,022,836 B2
(45) Date of Patent: Jun. 1, 2021

(54) POLARIZER AND DISPLAY DEVICE (71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Xiaolong Xie, Beijing (CN); Fengzhen Lv, Beijing (CN); Xinxia Zhang, Beijing (CN); Xiao Guo, Beijing (CN); Qun Li, Beijing (CN); Huan Ni, Beijing (CN); Chengpeng Yao, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 545 days.

(21) Appl. No.: 15/767,196

(22) PCT Filed: Sep. 28, 2017

(86) PCT No.: PCT/CN2017/103888
§ 371 (c)(1),
(2) Date: Apr. 10, 2018

(87) PCT Pub. No.: WO2018/166175
PCT Pub. Date: Sep. 20, 2018

(65) Prior Publication Data
US 2019/0072816 A1    Mar. 7, 2019

(30) Foreign Application Priority Data

Mar. 15, 2017  (CN) .......................... 201710153157.1

(51) Int. Cl.
G02B 5/30      (2006.01)
G02F 1/1335    (2006.01)
(Continued)

(52) U.S. Cl.
CPC ....... G02F 1/133528 (2013.01); G02B 5/201 (2013.01); G02B 5/223 (2013.01);
(Continued)

(58) Field of Classification Search
CPC ..... G02F 2001/01791; G02F 1/133514; G02F 1/133528
(Continued)

(56) References Cited

U.S. PATENT DOCUMENTS

2010/0201915 A1* 8/2010 Yokota .................... H01J 61/16
                                                        349/62
2012/0287381 A1* 11/2012 Li ........................ G02F 1/133617
                                                        349/106
(Continued)

FOREIGN PATENT DOCUMENTS

CN      103091895 A      5/2013
CN      103235357 A      8/2013
(Continued)

OTHER PUBLICATIONS

PCT International Search Report, Application No. PCT/CN2017/103888, dated Jan. 9, 2018, 9 pages: with English translation.
(Continued)

*Primary Examiner* — Ricky D Shafer
(74) *Attorney, Agent, or Firm* — Armstrong Teasdale LLP (57) ABSTRACT The present disclosure relates to a polarizer and a display device. The polarizer includes a polarization layer, a color filter layer located on the polarization layer, wherein the color filter layer includes a quantum dot. The application of the polarizer provided by the embodiments of the present (Continued)

disclosure to the display device can increase the color gamut, the color purity, and the light utilization, thereby improving the display color quality.

11 Claims, 5 Drawing Sheets

(51) Int. Cl.
  *G02B 5/20*   (2006.01)
  *G02B 5/22*   (2006.01)
  *G02B 1/14*   (2015.01)
  *G02F 1/017*  (2006.01)

(52) U.S. Cl.
  CPC ............. *G02B 5/30* (2013.01); *G02B 5/3033* (2013.01); *G02F 1/133514* (2013.01); *G02B 1/14* (2015.01); *G02F 1/01791* (2021.01); *G02F 1/133512* (2013.01); *G02F 1/133567* (2021.01)

(58) Field of Classification Search
  USPC ................ 359/487.01; 349/96, 106, 110
  See application file for complete search history.

(56) References Cited

U.S. PATENT DOCUMENTS

| | | | |
|---|---|---|---|
| 2013/0242228 A1* | 9/2013 | Park | G02F 1/133617 349/61 |
| 2015/0331278 A1* | 11/2015 | Araki | G02F 1/1362 349/61 |
| 2016/0070137 A1 | 3/2016 | You et al. | |
| 2016/0357068 A1* | 12/2016 | Yang | G02F 1/133615 |
| 2017/0031205 A1* | 2/2017 | Lee | G02F 1/133621 |
| 2017/0052444 A1* | 2/2017 | Park | G02B 5/223 |
| 2017/0255055 A1* | 9/2017 | Liang | G02F 1/1337 |
| 2017/0255056 A1* | 9/2017 | Liu | G02F 1/133512 |
| 2018/0031909 A1* | 2/2018 | Liu | G02F 1/133514 |
| 2018/0100956 A1* | 4/2018 | Lee | G02B 5/3058 |
| 2018/0157105 A1* | 6/2018 | Chen | G02F 1/133516 |
| 2019/0384110 A1* | 12/2019 | Tanaka | H01L 51/50 |

FOREIGN PATENT DOCUMENTS

| | | |
|---|---|---|
| CN | 104765187 A | 7/2015 |
| CN | 104849904 A | 8/2015 |
| CN | 105044985 A | 11/2015 |
| CN | 105204106 A | 12/2015 |
| CN | 105242448 A | 1/2016 |
| CN | 105425328 A | 3/2016 |
| CN | 105467666 A | 4/2016 |
| CN | 105925215 A | 9/2016 |
| CN | 106680925 A | 5/2017 |

OTHER PUBLICATIONS

PCT Written Opinion, Application No. PCT/CN2017/103888, dated Jan. 9, 2018, 7 pages.: with English translation of relevant part.
China First Office Action, Application No. 201710153157.1, dated Jul. 4, 2018, 16 pages.: with English translation.

* cited by examiner

POLARIZER AND DISPLAY DEVICE

CROSS REFERENCE TO RELATED APPLICATIONS

This patent application is a National Stage Entry of PCT/CN2017/103888 filed on Sep. 28, 2017, which claims the benefit and priority of Chinese patent application No. 201710153157.1 filed on Mar. 15, 2017, the disclosures of which are incorporated herein by reference in their entirety as a part of the present application.

BACKGROUND

The present disclosure relates to the field of display techniques, and particularly, to a polarizer and a display device.

Liquid crystal display includes a thin film transistor (TFT) substrate, a color filter substrate, and a liquid crystal layer therebetween. Color filter substrate is mainly for the purpose of filtering incident light to achieve a color display. After incident color-mixed light passes through red/green/blue materials, light of red/green/blue wavelengths is transmitted, accordingly. However, this type of color display is often affected by dyes and cannot achieve a high color gamut. In addition, since red/green/blue color materials can only transmit light of a specific wavelength, the loss of light intensity is serious.

BRIEF DESCRIPTION

The embodiments of the present disclosure provide a polarizer and a display device.

A first aspect of the present disclosure provides a polarizer, including a polarization layer and a color filter layer located on the polarization layer, wherein the color filter layer includes a quantum dot.

In one embodiment, the polarization layer includes a first protection layer, a polarization functional layer, and a second protection layer from bottom to top.

In one embodiment, the color filter layer is located on the second protection layer.

In one embodiment, the polarizer further includes a third protection layer located on the color filter layer.

In one embodiment, the polarizer further includes a protection film located on the third protection layer.

In one embodiment, the polarizer further includes an adhesive layer and a release film that are sequentially located under the first protection layer.

In one embodiment, the color filter layer includes a color block, and the quantum dot is contained in the color block.

In one embodiment, the color filter layer further includes a black matrix located between adjacent color blocks.

In one embodiment, a material of the adhesive layer includes a pressure sensitive adhesive, materials of the first protection layer, the second protection layer, and the third protection layer include triacetyl cellulose, and a material of the polarization functional layer includes polyvinyl alcohol.

In one embodiment, a material of the quantum dot includes a semiconductor material.

A second aspect of the present disclosure provides a display device, including an array substrate, a counter substrate opposite to the array substrate, and the polarizer disposed on at least one of the array substrate and the counter substrate as described in the first aspect of the present disclosure.

In one embodiment, the polarizer is disposed on the array substrate, and the polarizer is disposed so that the color filter layer is farther away from the counter substrate than the polarization layer.

In one embodiment, the polarizer is disposed on the counter substrate, and the polarizer is disposed so that the color filter layer is farther away from the array substrate than the polarization layer.

In one embodiment, the polarizer are disposed on both the counter substrate and the array substrate, the polarizer on the counter substrate is disposed so that the color filter layer is farther away from the array substrate than the polarization layer, and the polarizer on the array substrate is disposed so that the color filter layer is farther away from the counter substrate than the polarization layer.

In one embodiment, the counter substrate further includes a black matrix, the black matrix is located at a side of the counter substrate where the polarizer is not disposed, or in the color filter layer.

Further aspects and scopes of applicability will become apparent from the description provided herein. It should be understood that various aspects of this disclosure may be implemented individually or in combination with one or more other aspects. It should also be understood that the description and specific examples herein are intended merely for the purpose of illustration, rather than limiting the scope of this disclosure.

BRIEF DESCRIPTION OF THE DRAWINGS

The drawings described herein are for illustrative purpose only of selected embodiments rather than any possible implementation, and they are not intended to limit the scope of this disclosure, in which.

Corresponding reference numerals indicate corresponding components or features throughout the views of those drawings.

DETAILED DESCRIPTION

Firstly, it should be noted that unless additionally and explicitly pointed out in the context, the singular form of the words used herein and in the appended claims includes the plural form, and vice versa. Thus, when a word is mentioned in the singular form, it usually includes the plural form. Similarly, the words "include" and "comprise" will be interpreted as inclusive rather than exclusive. Where the term "example" is used herein, and particularly following a group of terms, it is merely exemplary and illustrative, and should not be considered as exclusive or extensive. The terms "first", "second", "third" and the like are just used for description, and should not be understood as indicating or implying any relative importance or formation order.

In addition, in the drawings, the thickness and area of each layer are exaggerated for clarity. It should be understood that the orientation or position relationship indicated by the terms "longitudinal", "radial", "upper", "lower", "front", "rear", "left", "right", "vertical", "horizontal", "top", "bottom", "in", "out" and the like are those illustrated based on the orientation or position relationship shown in the drawings. They are just used to facilitate and simplify the description of the embodiments of the present disclosure, rather than indicating or implying that any mentioned component must have a particular orientation, or be constructed or operated in a particular orientation, and hence cannot be understood as limitations to the present disclosure. In addition, when an element or layer is referred to as being "on" another element or layer, it may be directly located on the another element or layer, or there may be an intermediate element or layer, similarly, when an element or layer is referred to as being "under" another element or layer, it may be directly located under the another element or layer, or there may be at least one intermediate element or layer, and when an element or layer is referred to as being "between" two elements or layers, it may be an only element or layer between the two elements or layers, or there may be more than one intermediate element or layer.

The exemplary embodiments will now be described more fully with reference to the drawings.

Quantum dot is composed of a finite number of atoms, and the sizes of the quantum dot in three dimensions are all in the order of nanometers. The quantum dot is generally made of semiconductor materials, for example including but not limited to, Group II-VI compound semiconductor materials (e.g., CdS, CdSe, CdTe, ZnSe, etc.) or Group III-V compound semiconductor materials (e.g., InP, InAs, etc.). The emission spectrum of the quantum dot can be controlled by changing the sizes of the quantum dot. Therefore, the emission spectrum of the quantum dot can cover the entire visible light region by changing the sizes and chemical composition of the material of the quantum dot. Since the quantum dot has a broad excitation spectrum and a narrow emission spectrum, the color purity can be improved. In addition, the quantum dot has advantages in both the color saturation and the light utilization. The application of the quantum dot to the color filter can improve the color gamut, the color purity, and transmittance, so as to achieve better display effect.

The embodiments described herein provide a polarizer including a quantum dot color filter. The application of the polarizer to a display device can improve the color gamut, the color purity, and the light utilization of the display device, thereby improving the display color quality. In addition, since a color filter layer is formed in the polarizer, the structure of the display device can be further simplified, thereby making the display device simple and light.

An exemplary polarizer provided by an embodiment of the present disclosure will now be described in details with reference to FIG. 1.

Figure 1:
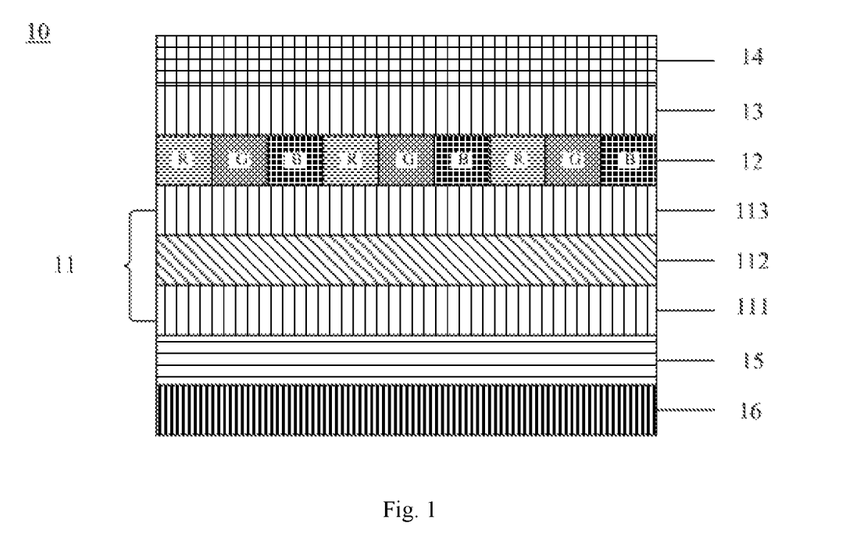
FIG. 1 schematically illustrates a cross-sectional view of an exemplary polarizer according to an embodiment of the present disclosure.

FIG. 1 schematically illustrates a cross-sectional view of an exemplary polarizer 10 according to an embodiment of the present disclosure. The polarizer 10 may include a polarization layer 11 and a color filter layer 12 located on the polarization layer 11. In this embodiment, the color filter layer 12 may include quantum dots. A person skilled in the art can understand that the polarization layer 11 includes not only a polarization functional layer 112 for realizing the polarization function, but also other additional layers for realizing additional functions.

In one exemplary embodiment, the polarization layer 11 may include a first protection layer 111, a polarization functional layer 112, and a second protection layer 113 from bottom to top. According to the embodiment of the present disclosure, materials of the first protection layer 111 and the second protection layer 113 may include triacetyl cellulose (TAC), and the material of the polarization functional layer 112 may include polyvinyl alcohol (PVA). It should be understood that the materials of the protection layer and the polarization functional layer are not limited thereto, and any other materials that can achieve protection and polarization can be applied.

In one exemplary embodiment, the color filter layer 12 may be located on the second protection layer 113. According to the embodiment of the present disclosure, the polarizer 10 may further include a third protection layer 13 located on the color filter layer 12. The third protection layer 13 can prevent a surface of the color filter layer 12 from being contaminated or damaged. According to the embodiment of the present disclosure, the material of the third protection layer 13 may include the same material as the first protection layer 111 or the second protection layer 113, such as triacetyl cellulose (TAC).

In one exemplary embodiment, the polarizer 10 may additionally include a protection film 14 located on the third protection layer 13, so as to protect the polarizer 10 from being damaged. The protection film 14 can be removed after the polarizer 10 is attached to display device.

In one exemplary embodiment, the polarizer 10 may further include an adhesive layer 15 and a release film 16 that are sequentially located under the polarization layer 11. According to the embodiment of the present disclosure, the material of the adhesive layer 15 may include a pressure sensitive adhesive (PSA), or any other materials that can achieve an adhesive effect. The release film 16 may be removed during the adhesion, and the polarizer 10 may be adhered to an array substrate or a counter substrate through the adhesive layer 15.

In one exemplary embodiment, the color filter layer 12 may include a color block and quantum dots contained in the color block. According to the embodiment of the present disclosure, the color block may include a red block (R), a green block (G), and a blue block (B). Specifically, the red block (R) contains quantum dots emitting red light, the green block (G) contains quantum dots emitting green light, and the blue block (B) contains quantum dots emitting blue light, so as to display three primary colors of red, green, and blue. In one exemplary embodiment, the material of the quantum dot may include compound semiconductor materials selected from Group II-VI compound semiconductor materials and Group III-V compound semiconductor materials. For example, the Group II-VI compound semiconductor materials include, but not limited to, CdS, CdSe, CdTe, and ZnSe, and the Group III-V compound semiconductor materials include, but not limited to InP and InAs.

It should be understood that the embodiments of the present disclosure are not limited to the above structures, the color filter layer may be disposed at any appropriate position in the polarizer as long as the material of the quantum dot in the color filter layer does not destroy the polarization of polarized light passing through the polarization functional layer.

According to the embodiment of the present disclosure, the application of the quantum dot to the polarizer can improve the color gamut, the color purity, and the transmittance of the emission light passing through the polarizer, so as to achieve a better display effect.

It should be noted that the structure of the polarizer 10 as shown in FIG. 1 is also suitable to other embodiments described herein, and the description thereof will not be repeated in other embodiments.

Figure 2:
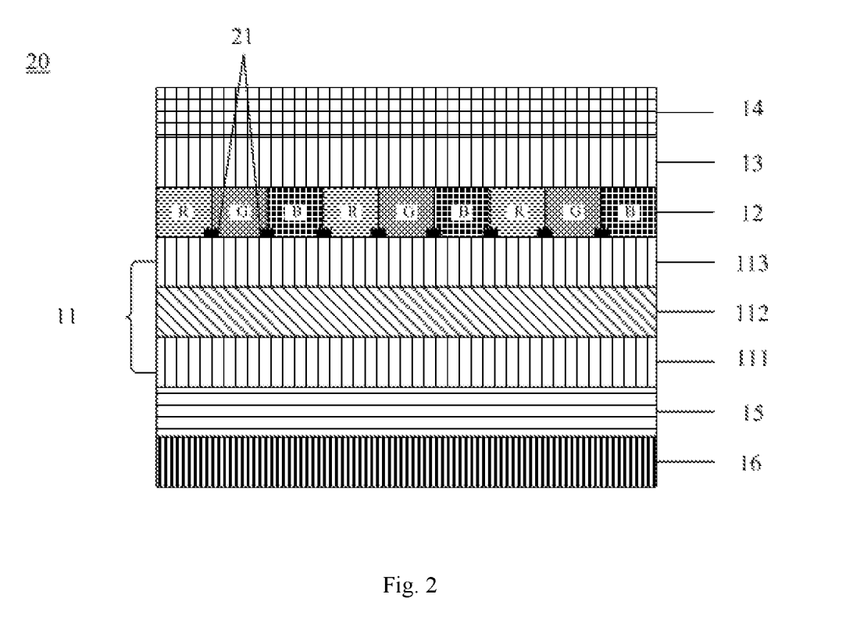
FIG. 2 schematically illustrates a cross-sectional view of an exemplary polarizer according to another embodiment of the present disclosure.

FIG. 2 schematically illustrates a cross-sectional view of an exemplary polarizer 20 according to another embodiment of the present disclosure. In one exemplary embodiment, the color filter layer 12 additionally includes a black matrix 21 located between adjacent color blocks. Other structures and functions of the polarizer 20 are the same as those of the polarizer 10 already described above and will not be repeated in this embodiment.

A display device is further provided in the embodiments described herein. The display device can improve the color gamut, the color purity, and the light utilization, thereby improving the display color quality. Now an exemplary display device provided by an embodiment of the present disclosure will be described in details with reference to FIGS. 3A, 3B, 3C, and 3D.

FIGS. 3A, 3B, 3C, and 3D schematically illustrate cross-sectional views of an exemplary display device 30 according to an embodiment of the present disclosure. The display device 30 may include an array substrate 31, a counter substrate 32 opposite to the array substrate 31, and a polarizer 10 according to the above embodiment of the present disclosure disposed on at least one of the array substrate 31 and the counter substrate 32. In addition, the display device 30 may further include a liquid crystal layer 33 disposed between the array substrate 31 and the counter substrate 32.

Figure 3A:
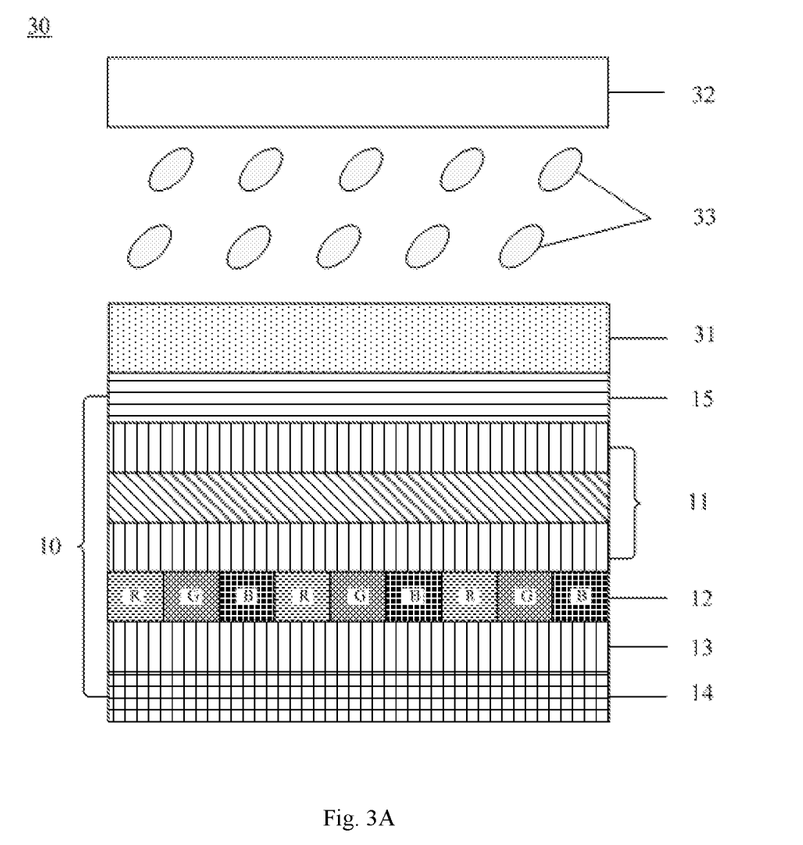
FIGS. 3A, 3B, 3C, and 3D schematically illustrate cross-sectional views of an exemplary display device according to an embodiment of the present disclosure.

In one exemplary embodiment, as shown in FIG. 3A, the polarizer 10 may be disposed on the array substrate 31 to serve as a lower polarizer of the display device 30, and the polarizer 10 is disposed so that the color filter layer 12 is farther away from the counter substrate 32 than the polarization layer 11. It should be understood that the display device 30 further includes an upper polarizer (not shown), which can be used in coordination with the lower polarizer to achieve the normal display of the display device 30.

Since the light emitted by the quantum dot is electron excitation light, the polarization state is not controlled. By disposing the polarizer 10 so that the color filter layer 12 is farther from the counter substrate 32 than the polarization layer 11, the quantum dot in the color filter layer 12 will not interfere with the normal control of the polarization of light by the liquid crystal molecules. This eliminates the potential adverse effect on the normal display from the quantum dots due to interference with the polarization of light.

Figure 3B:
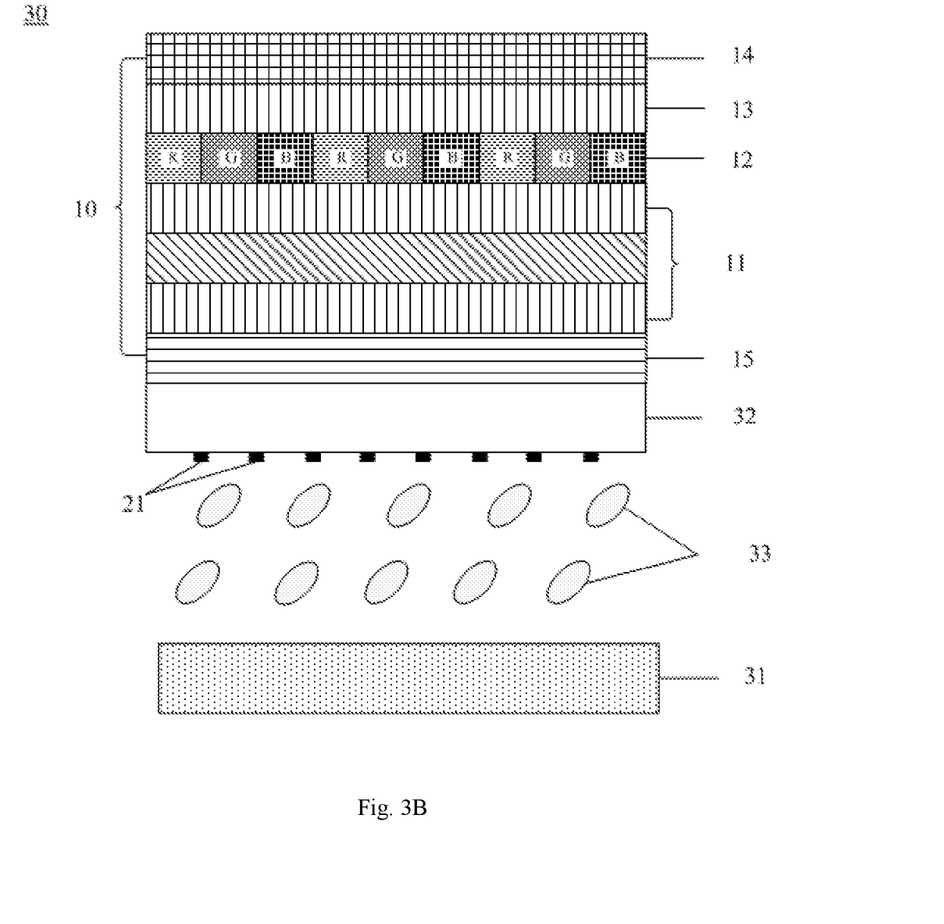
Figure 3C:
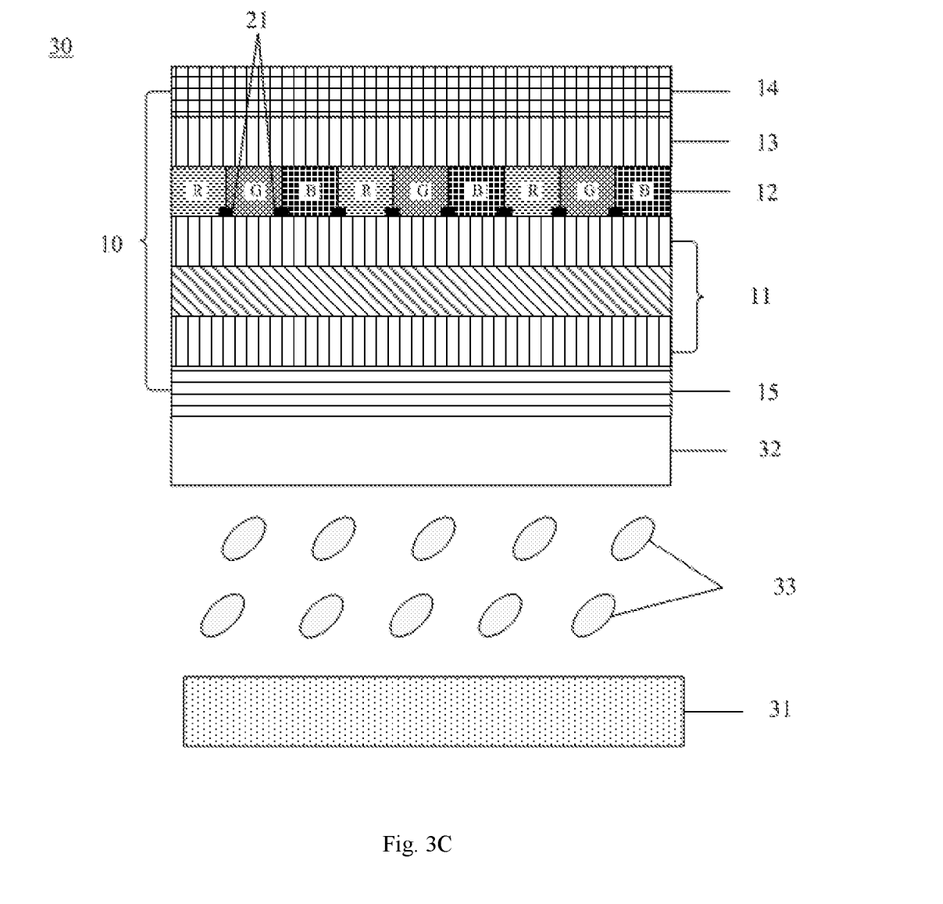

In one exemplary embodiment, as shown in FIG. 3B, the polarizer 10 may also be disposed on the counter substrate 32 to serve as an upper polarizer of the display device 30, and the polarizer 10 is disposed so that the color filter layer 12 is farther away from the array substrate 31 than the polarization layer 11. It should be understood that the display device 30 further includes a lower polarizer (not shown), which can be used in coordination with the upper polarizer to achieve the normal display of the display device 30. According to one embodiment of the present disclosure, the counter substrate 32 may further include a black matrix 21 located at a side of the counter substrate 32 where the polarizer 10 is not disposed. According to another embodiment of the present disclosure, as shown in FIG. 3C, the black matrix 21 is located between adjacent color blocks of the color filter layer 12 of the polarizer 10. The black matrix 21 for example prevents a light leakage or a color mixing and enhances a color contrast between the color blocks.

Since the light emitted by the quantum dot is electron excitation light, the polarization state is not controlled. By disposing the polarizer 10 so that the color filter layer 12 is farther from the array substrate 31 than the polarization layer 11, the quantum dot in the color filter layer 12 will not interfere with the normal control of the polarization of light by the liquid crystal molecules. This eliminates the potential adverse effect on the normal display from the quantum dots due to interference with the polarization of light.

Figure 3D:
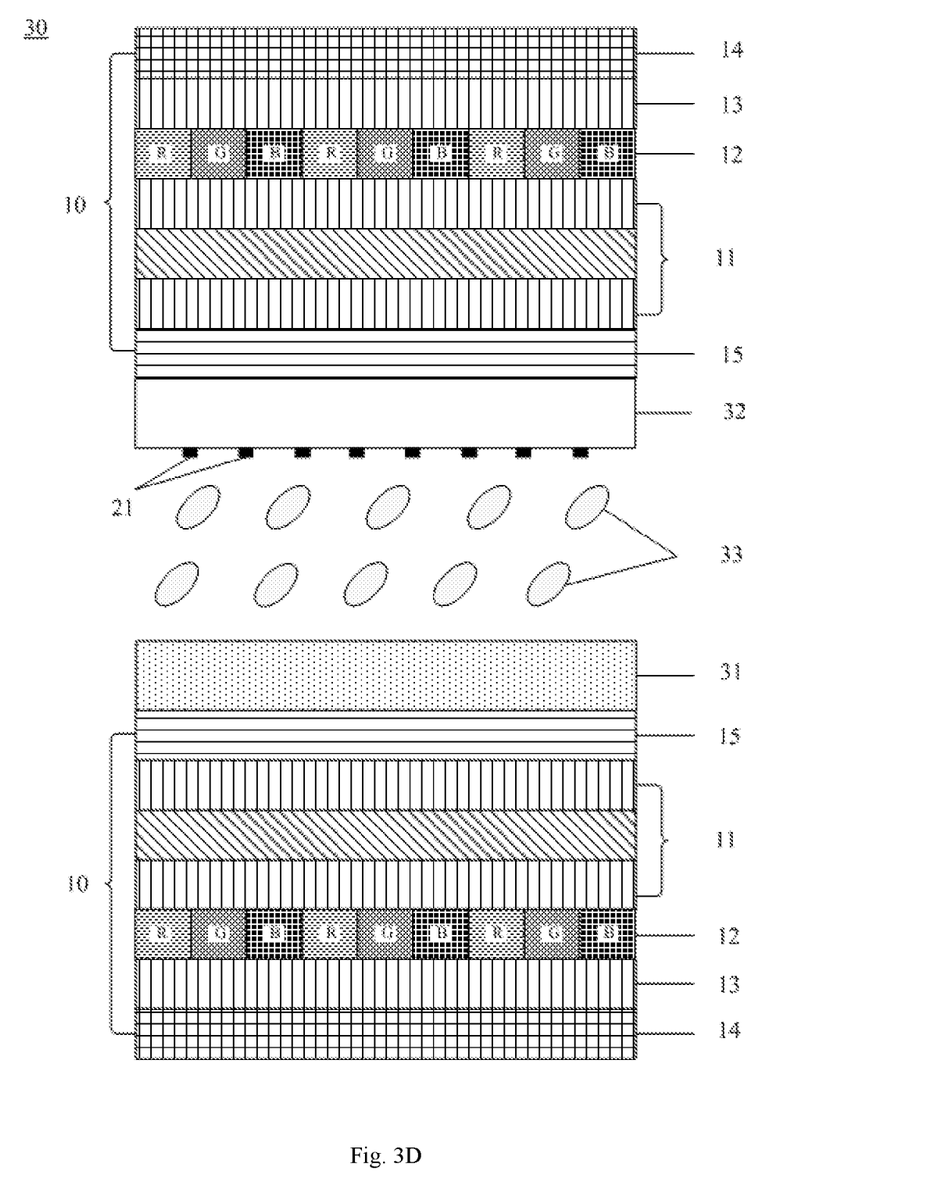

In one exemplary embodiment, as shown in FIG. 3D, the polarizer 10 may also be disposed on the counter substrate 32 and the array substrate 31 to serve as an upper polarizer and a lower polarizer of the display device, respectively. The polarizer 10 on the counter substrate 32 is disposed so that the color filter layer 12 is farther from the array substrate 31 than the polarization layer 11, and the polarizer 10 on the array substrate 31 is disposed so that the color filter layer 12 is farther away from the counter substrate 32 than the polarization layer 11. According to one embodiment of the present disclosure, the counter substrate 32 may further include a black matrix 21, the black matrix 21 is located at a side of the counter substrate 32 where the polarizer 10 is not disposed, for example to prevent a light leakage or a color mixing and enhance a color contrast between the color blocks. It should be understood that the counter substrate 32 may further include a black matrix 21, which may be located between adjacent color blocks of the color filter layer 12 of the polarizer 10.

It should be noted that, in the above embodiment, the polarizer 10 can be easily attached to the array substrate 31 or the counter substrate 32 through the adhesive layer 15, which simplifies the manufacturing process and improves the productivity with respect to the conventional method.

It should be understood that the counter substrate 32 may include, in addition to the above components, a conductive layer (not shown) made of a transparent material such as indium tin oxide (ITO) or indium zinc oxide (IZO) formed on the counter substrate 32 to serve as a common electrode, or any other component based on actual needs. The array substrate 31 may include, in addition to the above components, a thin film transistor (TFT) formed on the array substrate 31, or a plurality of pixel electrodes (not shown) electrically connected to the thin film transistor and made of a transparent conductive material such as ITO or IZO. In the embodiments of the present disclosure, those components are not described in details, but this does not mean that the counter substrate 32 and the array substrate 31 described herein do not have those components.

As described above, the application of a polarizer including a quantum dot to the display device not only improves the color gamut, the color purity, and the light utilization of the display device to improve the display color quality, but also avoids the potential problem of the In-Cell polarizer.

The foregoing descriptions of the embodiments have been provided for the purposes of illustration and description. It is not intended to be exhaustive or to limit the application. Individual elements or features of a particular embodiment are generally not limited to that particular embodiment, but where appropriate, these elements and features are interchangeable and can be used in a selected embodiment, even if not specifically illustrated or described. The same may also be varied in many ways. Such a variation should not be considered as a departure from the disclosure, and all those modifications are included within the scope of the disclosure.

What is claimed is:

1. A display device comprising an array substrate, a counter substrate opposite to the array substrate, and a polarizer,
   wherein the polarizer comprises a polarization layer, and a color filter layer located on the polarization layer, and
   wherein the color filter layer comprises a quantum dot, wherein the polarizer is disposed on the counter substrate, and wherein the polarizer is disposed so that the color filter layer is farther away from the array substrate than the polarization layer, wherein the display device further comprises an additional polarizer, and wherein the additional polarizer comprises a polarization layer, and a color filter layer located on the polarization layer, and wherein the color filter layer comprises a quantum dot, wherein the additional polarizer is disposed on the array substrate, and wherein the additional polarizer is disposed so that the color filter layer of the additional polarizer is farther away from the counter substrate than the polarization layer of the additional polarizer.

2. The display device according to claim 1, wherein the polarization layer comprises a first protection layer, a polarization functional layer, and a second protection layer from bottom to top.

3. The display device according to claim 2, wherein the color filter layer is located on the second protection layer.

4. The display device according to claim 3, further comprising a third protection layer located on the color filter layer.

5. The display device according to claim 4, further comprising a protection film located on the third protection layer.

6. The display device according to claim 5, further comprising an adhesive layer and a release film that are sequentially located under the first protection layer.

7. The display device according to claim 6, wherein a material of the adhesive layer comprises a pressure sensitive adhesive, wherein materials of the first protection layer, the second protection layer, and the third protection layer comprise triacetyl cellulose, and wherein a material of the polarization functional layer comprises polyvinyl alcohol.

8. The display device according to claim 1, wherein the color filter layer comprises a color block, and wherein the quantum dot is contained in the color block.

9. The display device according to claim 8, wherein the color filter layer further comprises a black matrix located between adjacent color blocks.

10. The display device according to claim 1, wherein a material of the quantum dot comprises a semiconductor material.

11. The display device according to claim 1, wherein the counter substrate further comprises a black matrix, and wherein the black matrix is located one of i) at a side of the counter substrate where the polarizer is not disposed, and ii) in the color filter layer of the polarizer.

* * * * *